United States Patent
Kume et al.

(10) Patent No.: US 9,010,860 B2
(45) Date of Patent: Apr. 21, 2015

(54) VEHICLE SEAT DEVICE

(75) Inventors: Sho Kume, Nagoya (JP); Genta Moriyama, Anjo (JP); Hideki Fujisawa, Hekinan (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 146 days.

(21) Appl. No.: 13/820,189

(22) PCT Filed: Sep. 7, 2011

(86) PCT No.: PCT/JP2011/070327
§ 371 (c)(1),
(2), (4) Date: Mar. 1, 2013

(87) PCT Pub. No.: WO2012/039281
PCT Pub. Date: Mar. 29, 2012

(65) Prior Publication Data
US 2013/0162000 A1    Jun. 27, 2013

(30) Foreign Application Priority Data
Sep. 24, 2010  (JP) ................................. 2010-213524

(51) Int. Cl.
*B60N 2/44* (2006.01)
*B60N 2/02* (2006.01)
*B60N 2/06* (2006.01)
*B60N 2/08* (2006.01)

(52) U.S. Cl.
CPC ............... *B60N 2/44* (2013.01); *B60N 2/0232* (2013.01); *B60N 2/0296* (2013.01); *B60N 2/062* (2013.01); *B60N 2/0881* (2013.01)

(58) Field of Classification Search
USPC ................................ 297/344.1, 344.24, 463.1
See application file for complete search history.

(56) References Cited

U.S. PATENT DOCUMENTS 4,691,584 A * 9/1987 Takaishi et al. ............. 74/471 R
5,161,765 A * 11/1992 Wilson .......................... 248/425
(Continued)

FOREIGN PATENT DOCUMENTS

CN     201494331 U     6/2010
JP     61 241814       10/1986
(Continued)

OTHER PUBLICATIONS

International Search Report Issued Nov. 29, 2011 in PCT/JP11/70327 Filed Sep. 7, 2011.
(Continued)

*Primary Examiner* — Sarah B McPartlin
(74) *Attorney, Agent, or Firm* — Oblon, McClelland, Maier & Neustadt, L.L.P.

(57) ABSTRACT

A vehicle seat device is provided with a first lock mechanism which restricts a first movement of the seat, a second lock mechanism which restricts a second movement of the seat, and a drive source which removes the restrictions imposed by the first and second lock mechanisms. The drive source is provided with an output section which can be driven in two directions, that is, in the forward direction and the reverse direction, by the drive source. The drive of the output section in the forward direction from the neutral position thereof removes the restriction imposed by the first lock mechanism, and the drive of the output section in the reverse direction from the neutral position thereof removes the restriction imposed by the second lock mechanism.

7 Claims, 9 Drawing Sheets

(56) References Cited

U.S. PATENT DOCUMENTS

| | | | |
|---|---|---|---|
| 6,773,068 B2 * | 8/2004 | Shinozaki | 297/344.1 |
| 2007/0013218 A1 | 1/2007 | Kayumi et al. | |
| 2011/0074198 A1 * | 3/2011 | Iwasaki et al. | 297/344.24 |

FOREIGN PATENT DOCUMENTS

| | | |
|---|---|---|
| JP | 2005 206154 | 8/2005 |
| JP | 2007-22272 | 2/2007 |
| JP | 2008-230532 | 10/2008 |
| JP | 2008 285091 | 11/2008 |

OTHER PUBLICATIONS

English translation of the International Preliminary Report on Patentability and Written Opinion of the International Searching Authority issued Nov. 29, 2011, in PCT/JP2011/070327.

Combined Chinese Office Action and Search Report issued Nov. 2, 2014 in Patent Application No. 201180042359.X.

* cited by examiner

VEHICLE SEAT DEVICE

FIELD OF THE INVENTION

The present invention relates to a vehicle seat device.

BACKGROUND OF THE INVENTION

In the prior art, patent document 1 describes an example of a known vehicle seat device. In this vehicle seat device, a lower rail, which extends in the vehicle front-rear direction on the vehicle floor, movably supports an upper rail. A seat is fixed to the upper rail. The vehicle seat device further includes a lock mechanism, which restricts movement of the seat (upper rail) in the vehicle front-rear direction, and a driving source (actuator), which cancels the restriction imposed by the lock mechanism.

PRIOR ART DOCUMENT

Patent Document

Patent Document 1: Japanese Laid-Open Patent Publication No. 2005-206154

SUMMARY OF THE INVENTION

Some vehicle seat devices include various lock mechanisms in addition to the lock mechanism that restricts movement of the seat in the vehicle front-rear direction as described above. For example, one vehicle seat device includes a lock mechanism that restricts movement of a seat, which is also movable in the vehicle width direction, while another vehicle seat device includes a lock mechanism that restricts reclining of a seat back (backrest), which is inclinable with respect to a seat cushion defining a seating face of the seat.

However, the vehicle seat devices described above require a driving source for each lock mechanism. The driving sources are typically heavy and expensive. The use of a driving source for each lock mechanism results in, for example, a heavier and more expensive vehicle seat device.

It is an object of the present invention to provide a vehicle seat device that includes two lock mechanisms and can reduce the number of driving sources.

According to one aspect of the present invention, a vehicle seat device including a first lock mechanism that restricts a first movement of a seat, a second lock mechanism that restricts a second movement of the seat, and a driving source that cancels the restrictions imposed by the first and second lock mechanisms is provided. The driving source includes an output portion that can be driven by the driving source in two directions, a forward direction and a reverse direction. The output portion is driven in the forward direction from a neutral position to cancel the restriction imposed by the first lock mechanism, and the output portion is driven in the reverse direction from the neutral position to cancel the restriction imposed by the second lock mechanism.

This structure reduces the number of the driving sources (to one). The driving sources are typically heavy and expensive. The weight and cost of the vehicle seat device can be decreased by reducing the number of driving sources.

A first wire cable may be coupled to the first lock mechanism, and a second wire cable may be coupled to the second lock mechanism. The output portion may be coupled to the first and second wire cables to pull an inner wire of the first wire cable when the output portion is driven in the forward direction from the neutral position and pull an inner wire of the second wire cable when the output portion is driven in the reverse direction from the neutral position. The output portion may be coupled such that a driving force is not transmitted to the inner wire of the second wire cable when the output portion is driven in the forward direction from the neutral direction and such that a driving force is not transmitted to the inner wire of the first wire cable when the output portion is driven in the reverse direction from the neutral direction.

With this structure, the driving force of the output portion is not transmitted to the inner wire of the first wire cable or second wire cable that does not cancel the restriction. This avoids unnecessary deformation of the inner wire. If the inner wires were to be simply coupled to the output portion, the one of the inner wires that is not cancelling restriction would deform and thereby relieve the driving force. The deformation of the inner wires can be avoided by coupling the inner wires to the output portion such that the driving force applied in the direction opposite to the direction in which the inner wires are pulled is not transmitted to the inner wires. This improves the durability of the inner wires.

The driving source may be a pivoting source that can pivot the output portion. The output portion may include a slot that substantially has a shape of an arc extending about a pivotal center of the output portion. The inner wire of the first wire cable may have an end portion coupled to the slot so as to be pulled when the output portion is driven in the forward direction from the neutral position and moved relatively in the slot when the output portion is driven in the reverse direction from the neutral position without receiving a driving force. The inner wire of the second wire cable may have an end portion coupled to the slot so as to be pulled when the output portion is driven in the reverse direction from the neutral position and moved relatively in the slot when the output portion is driven in the forward direction from the neutral position without receiving a driving force. A direction in which the end portion of the inner wire of the first wire cable moves when the output portion is driven from the neutral position to a pivot end in the forward direction and a direction in which the end portion of the inner wire of the second wire cable moves when the output portion is driven from the neutral position to a pivot end in the reverse direction may not extend along the same straight line and form an angle.

This structure avoids deformation of the inner wire in the structure that pivots the output portion and improves the durability of the inner wires.

In addition, compared to a structure in which an end portion of the inner wire of the first wire cable and an end portion of the inner wire of the second wire cable are pulled along the same straight line (structure in which the pulling amounts (strokes) are added together along the same straight line), this structure reduces the size of the vehicle seat device in the direction of the straight line.

The driving source may be an electric motor driven when activated and may be configured to prevent movement of the output portion when the electric motor is in a deactivated state.

With this structure, for example, when maintaining the state in which the output portion is driven from the neutral position in the forward direction, or maintaining the state in which the restriction imposed by the first lock mechanism is cancelled, deactivation of the electric motor reduces heat generation and the power consumption of the electric motor.

The vehicle seat may include a first switch that switches output signals when the output portion is located at a position closer to the neutral position than a position of the output portion corresponding to where the first mechanism is switched between a restriction state and a non-restriction state, and a second switch that switches output signals when the output portion is located at a position closer to the neutral position than a position of the output portion corresponding to where the second mechanism is switched between a restriction state and a non-restriction state.

With this structure, the output signals of the first switch ensure that a first movement is restricted by the first lock mechanism. In addition, the output signals of the second switch ensure that a second movement is restricted by the second lock mechanism. The restrictions of the first and second movements are ensured by a simple structure. In addition, a passenger can be notified that the restriction of the first or second movement may be cancelled.

The driving source may be a pivoting source that can pivot the output portion. The output portion may include a control surface that has a projection surface and a depression surface arranged continuously in a pivotal direction of the output portion such that a radial position of the control surface varies along the pivotal direction. The first and second switches each may be a limit switch that includes a main body portion and a lever extending from the main body portion. The limit switch may be arranged such that the limit switch can face the control surface in the radial direction. The limit switch may be in an on-state when the lever is pushed by the projection surface of the control surface depending on the pivotal position of the output portion. The depression surface of the control surface may contact the lever while maintaining the limit switch in an off-state when the output portion is in the neutral position.

This structure avoids contact of the levers with the control surface whenever the output portion is pivoted and the levers are pushed by the projection surface of the control surface. In other words, if the depression surfaces were arranged out of contact with the levers, the levers would come into contact with the control surface whenever the output portion is pivoted and the levers are pushed by the projection surface. This is avoided in the structure describe above. Accordingly, the number of contacts from a state in which the levers are separated from the control surface can be reduced. This improves the durability of the levers.

The control surface may have a circumferential length set so that the control surface does not face the lever of the second switch when the output portion is pivoted to a pivot end in the forward direction and the control surface does not face the lever of the first switch when the output portion is pivoted to a pivot end in the reverse direction. The control surface may include two circumferential end portions. Each of the circumferential end portions may include a bent part that gradually decreases a radial distance from the lever when the output portion pivots from the pivot end to the neutral position.

This structure reduces the impact when the output plate comes into contact with the levers. This improves the durability of the levers while lowering the material cost by decreasing the circumferential length of the control surface.

The output portion may be formed from a metal plate. The control surface is formed in a bent portion obtained by bending a radially outer side of the output portion in a thickness direction of the output portion.

This structure reduces the manufacturing cost of the output portion. In addition, the control surface can have a sufficient width along the pivot axis of the control surface. Accordingly, the levers of the limit switches are prevented from being separated from the control surface in the direction of the pivot axis of the control surface. If the control surface were formed on the circumferential surface of the metal plate instead of on the bent portion, the control surface would have a width (thickness) along the pivot axis of the control surface that conforms to the thickness of the metal plate, and the levers would be separated from the control surface in the direction of the pivot axis of the control surface. This is easily avoided in the structure described above.

DETAILED DESCRIPTION OF THE INVENTION

One embodiment of the present invention will now be described with reference to FIGS. 1 to 11.

Figure 1:
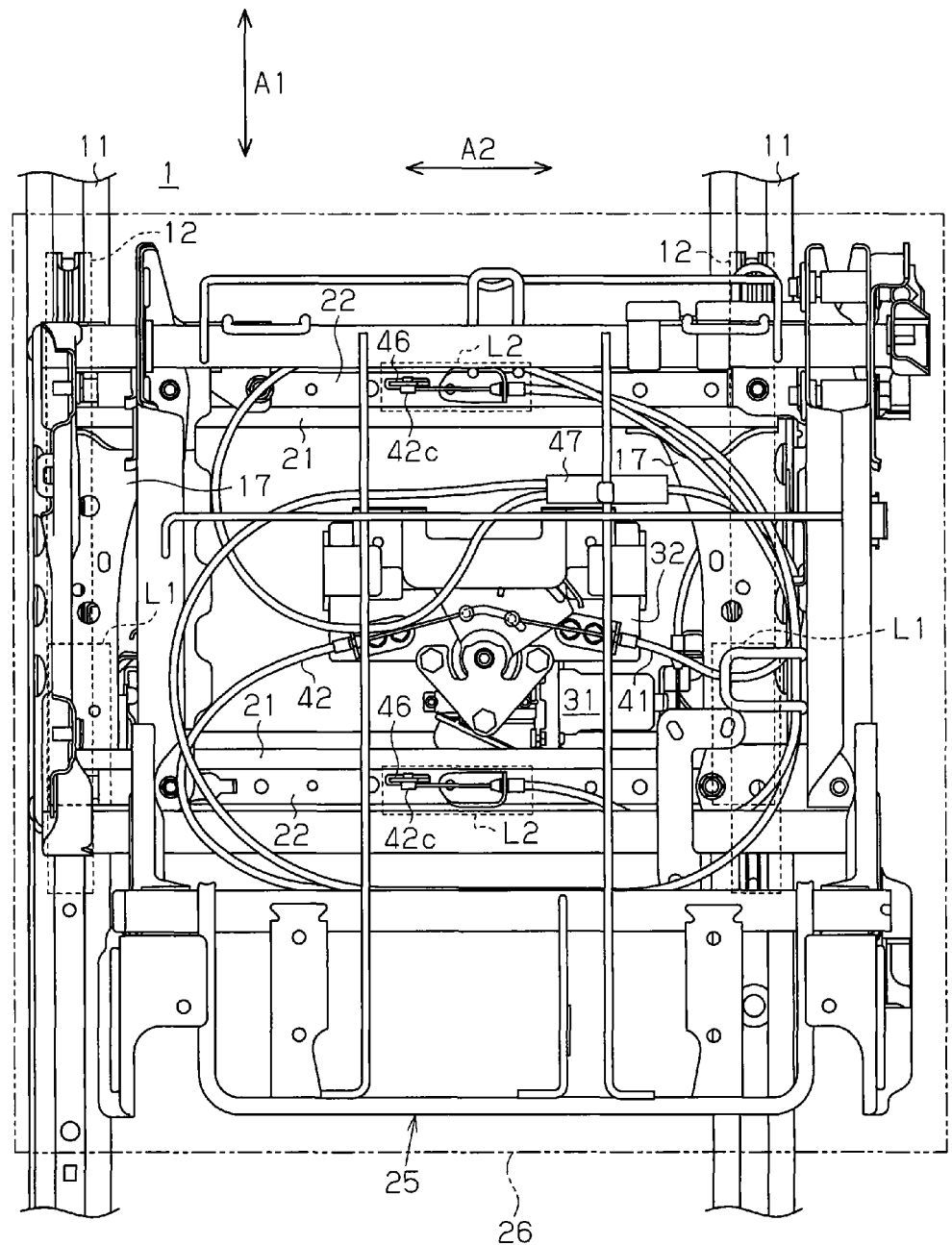
FIG. 1 is a plan view showing a vehicle seat device according to one embodiment of the present invention.
Figure 2:
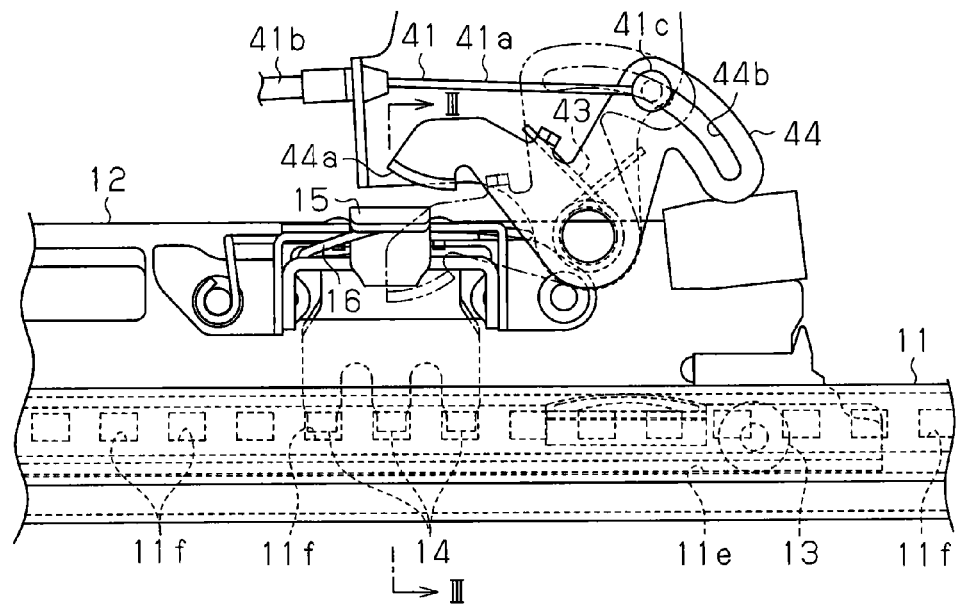
FIG. 2 is a side view showing a lower rail and upper rail of the embodiment.

As shown in FIG. 1, two metal lower rails 11 extending in the vehicle front-rear direction (direction indicated by arrow A1 in FIG. 1) are fixed to a vehicle floor 1. As shown in FIGS. 1 and 2, a metal upper rail 12 is supported by two rollers 13 (only one shown in FIG. 2) on each of the lower rails 11 so that the upper rail 12 can move (travel) in the vehicle front-rear direction.

Figure 3:
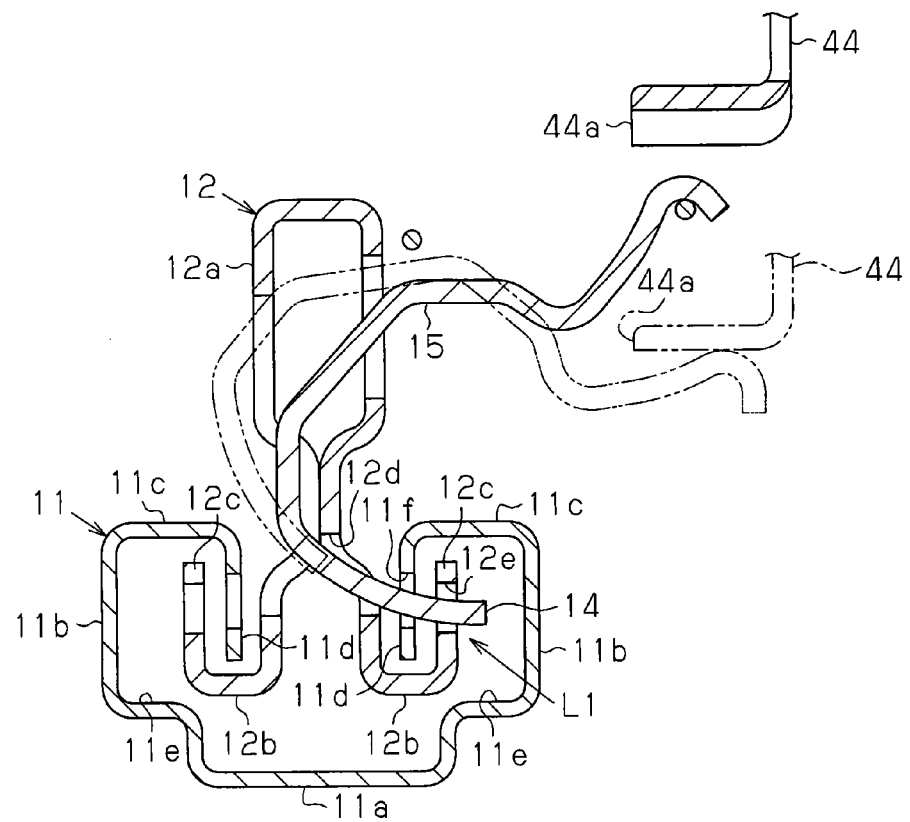
FIG. 3 is a cross-sectional view taken along line III-III in FIG. 2.

Specifically, as shown in FIG. 3, the lower rail 11 includes a bottom wall 11a, which extends in the vehicle front-rear direction, side walls 11b, which extend in the vertical direction from two ends of the bottom wall 11a in the vehicle width direction (direction indicated by arrow A2 in FIG. 1), inward extensions 11c, which extend inward from the top ends of the two side walls 11b in the vehicle width direction (toward each other), and downward extensions 11d, which extend downward from the distal ends of the inward extensions 11c. In this embodiment, the bottom wall 11a has two end portions in the vehicle width direction that include travel rail portions 11e formed by steps located at a higher level than the middle portion. The downward extension 11d includes a large number of locking holes 11f that are substantially tetragonal and arranged in the longitudinal direction (vehicle front-rear direction) at predetermined intervals (see FIGS. 2 and 3).

As shown in FIG. 3, the upper rail 12 includes two main walls 12a, which are arranged in the vehicle width direction between the two downward extensions 11d and connected with each other at the top ends, outward extensions 12b, which extend outward in the width direction (away from each other) from the bottom ends of the main walls 12a, and upward extensions 12c, which extend upward from the distal ends of the outward extensions 12b. The outward extensions 12b traverses the lower sides of the downward extensions 11d (spaced apart by a small gap), and the upward extensions 12c faces the downward extensions 11d in the width direction. Thus, the upper rail 12 is engageable with the lower rail 11 in the upward and width directions. This prevents the upper rail 12 from being separated from the lower rail 11.

The two rollers 13, which can roll on the travel rail portions 11e (see FIG. 2), are arranged on the upward extensions 12c of the upper rail 12 in the longitudinal direction of the upper rail 12. Thus, the upper rail 12 can move (travel) relative to the lower rail 11 in the front-rear direction.

As shown in FIGS. 2 and 3, the upper rail 12 includes locking hooks 14 that are insertable into the locking holes 11f to restrict movement of the upper rail 12 relative to the lower rail 11 in the front-rear direction. In this embodiment, the locking holes 11f and the locking hooks 14 form a first lock mechanism L1.

More specifically, as shown in FIG. 3, at the middle portion of the upper rail 12 in the front-rear direction, the main walls 12a and upward extensions 12c include a plurality of (three in this example) insertion holes 12d, 12e that are arranged at predetermined intervals (same intervals as the locking holes 11f) in the longitudinal direction (vehicle front-rear direction).

A locking lever 15, which includes the locking hooks 14 that are insertable into the insertion holes 12d, 12e and the locking holes 11f, is coupled to the upper rails 12 at a position corresponding to the insertion holes 12d, 12e. The locking lever 15 is pivotal about a rotation axis extending along the longitudinal direction of the upper rail 12. The locking hooks 14 can be inserted into and removed from the insertion holes 12e and locking holes 11f when the locking lever 15 pivots. When the locking hooks 14 of the locking lever 15 are inserted in the insertion holes 12e and the locking holes 11f (see FIG. 3), movement of the upper rail 12 relative to the lower rail 11 is restricted. When the locking lever 15 is pivoted to remove the locking hooks 14 from the insertion holes 12e and the locking holes 11f (as indicated by the double-dashed lines in FIG. 3), the restriction of the movement of the upper rail 12 in the vehicle front-rear direction is cancelled. This allows movement of the upper rail 12 relative to the lower rail 11.

The locking lever 15 is normally urged by a torsion spring 16 (see FIG. 2) in a direction that inserts the locking hooks 14 into the insertion holes 12e and the locking holes 11f, which restricts movement of the upper rail 12 relative to the lower rail 11. When an external operation force, which will be described below, is applied to the locking lever 15, the locking lever 15 is pivoted against the urging force of the torsion spring 16 in a direction to remove the locking hooks 14 from the insertion holes 12e and locking holes 11f, which allows movement of the upper rail 12 relative to the lower rail 11 (as indicated by the double-dashed lines in FIG. 3).

Figure 4:
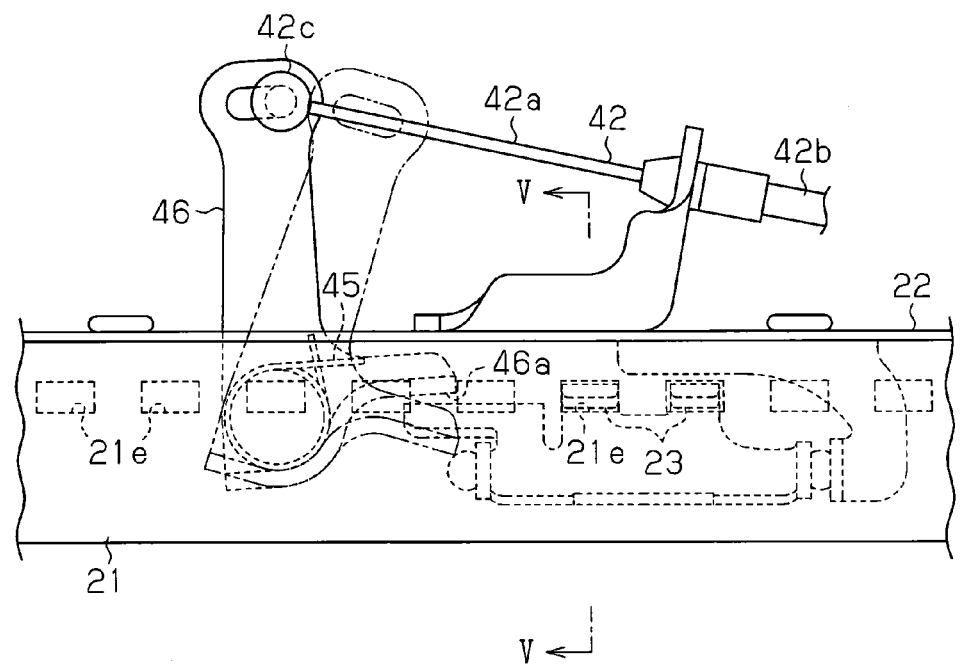
FIG. 4 is a side view showing a lateral slide lower rail and a lateral slide upper rail.
Figure 5:
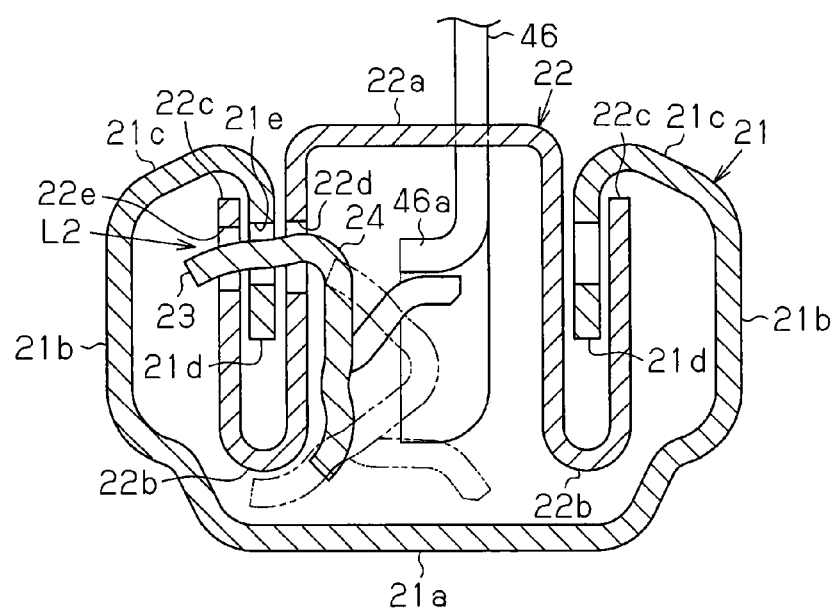
FIG. 5 is a cross-sectional view taken along line V-V in FIG. 4.

As shown in FIG. 1, the two upper rails 12, which are arranged in the vehicle width direction, are coupled to each other by a support frame 17 and two lateral slide lower rails 21 arranged in the vehicle front-rear direction. As shown in FIGS. 1, 4 and 5, the lateral slide lower rails 21 each support a lateral slide upper rail 22 with a structure similar to that of the lower rail 11 and the upper rail 12 such that the lateral slide upper rail 22 can move (travel) in the vehicle width direction.

Specifically, as shown in FIG. 5, the lateral slide lower rail 21 includes a bottom wall 21a, which extends in the vehicle width direction, side walls 21b, which extend in the vertical direction from the two ends of the bottom wall 21a in the vehicle front-rear direction, inward extensions 21c, which extend inward (toward each other) in the vehicle front-rear direction from the top ends of the side walls 21b, and downward extensions 21d, which extend downward from the distal ends of the inward extensions 21c. The downward extension 21d includes a large number of locking holes 21e that are substantially tetragonal and arranged at predetermined intervals (see FIGS. 4 and 5) in the longitudinal direction (vehicle width direction).

As shown in FIG. 5, the lateral slide upper rail 22 includes two main walls 22a, which are arranged in the vehicle front-rear direction between the two downward extensions 21d and connected with each other at the top ends, outward extensions 22b, which extend outward (away from each other) from the bottom ends of the main walls 22a, and upward extensions 22c, which extend upward from the distal ends of the outward extensions 22b. The outward extensions 22b traverses a lower side of the downward extensions 21d (spaced apart by a small gap), and the upward extensions 22c face the outward extensions 12b in the width direction. Thus, the lateral slide upper rail 22 is engageable with the lateral slide lower rail 21 in the upward and width directions. This prevents the lateral slide upper rail 22 from being separated from the lateral slide lower rail 21. In addition, rollers (not shown) allow the lateral slide upper rail 22 to move (travel) relative to the lateral slide lower rail 21 in the vehicle width direction.

As shown in FIGS. 4 and 5, the lateral slide upper rail 22 includes locking hooks 23 that are insertable into the locking holes 21e to prevent movement of the lateral slide upper rail 22 relative to the lateral slide lower rail 21 in the vehicle width direction. In this embodiment, the locking holes 21e and the locking hooks 23 form a second lock mechanism L2.

More specifically, as shown in FIG. 5, at the middle portion of the lateral slide upper rail 22 in the vehicle width direction, the main walls 22a and upward extensions 22c include a plurality of (two in this example) insertion holes 22d, 22e that are arranged in the longitudinal direction (vehicle width direction) at predetermined intervals (same intervals as the locking holes 21e).

A locking lever 24, which includes the locking hooks 23 that are insertable into the insertion holes 22d, 22e and the locking holes 21e, is coupled to the lateral slide upper rail 22 at a position corresponding to the insertion holes 22d, 22e. The locking lever 24 is pivotal about a rotation axis extending along the longitudinal direction of the lateral slide upper rail 22. The locking hooks 23 can be inserted into and removed from the insertion holes 22e and the locking holes 21e when the locking lever 24 pivots. When the locking hooks 23 of the locking lever 24 are inserted in the insertion holes 22e and the locking holes 21e (see FIG. 5), movement of the lateral slide upper rail 22 relative to the lateral slide lower rail 21 is restricted. When the locking lever 24 is pivoted to remove the locking hooks 23 from the insertion holes 22e and the locking holes 21e (as indicated by the double-dashed lines in FIG. 5), the restriction of the movement of the lateral slide upper rail 22 in the vehicle width direction is cancelled. This allows movement of the lateral slide upper rail 22 relative to the lateral slide lower rail 21.

The locking lever 24 is normally urged by a torsion spring (not shown) in a direction that inserts the locking hooks 23 into the insertion holes 22e and the locking holes 21e, which restricts movement of the lateral slide upper rail 22 relative to the lateral slide lower rail 21. When an external operation force, which will be described below, is applied to the locking lever 24, the locking lever 24 is pivoted against the urging force of the torsion spring in a direction to remove the locking hooks 23 from the insertion holes 22e and the locking holes 21e, which allows movement of the lateral slide upper rail 22 relative to the lateral slide lower rail 21 (as indicated by the double-dashed lines in FIG. 5).

As shown in FIG. 1, the two lateral slide upper rails 22, which are arranged in the vehicle front-rear direction, are coupled to each other by a seat cushion frame 25. A seat 26 (indicated by the double-dashed lines in FIG. 1) is fixed on the seat cushion frame 25. Accordingly, in this embodiment, movement of the upper rail 12 in the vehicle front-rear direction moves the seat 26 in the vehicle front-rear direction (first movement), and movement of the lateral slide upper rail 22 in the vehicle width direction moves the seat 26 in the vehicle width direction (second movement).

As shown in FIG. 1, an electric motor 31 is fixed to the support frame 17, which moves integrally with the upper rail 12, by a bracket plate 32. The electric motor 31 functions as a driving source or a pivoting source that cancels the restriction imposed by the first lock mechanism L1 (locking holes 11f, locking hooks 14, and the like) and the second lock mechanism L2 (locking holes 21e, locking hooks 23, and the like). The electric motor 31 accommodates a rotation sensor that can detect the number of rotations (and thus the position of an output plate 35). The electric motor 31 pivots the output plate 35, which will be described below, between the end of pivotal movement and the neutral portion based on the output of the rotation sensor.

Figure 6:
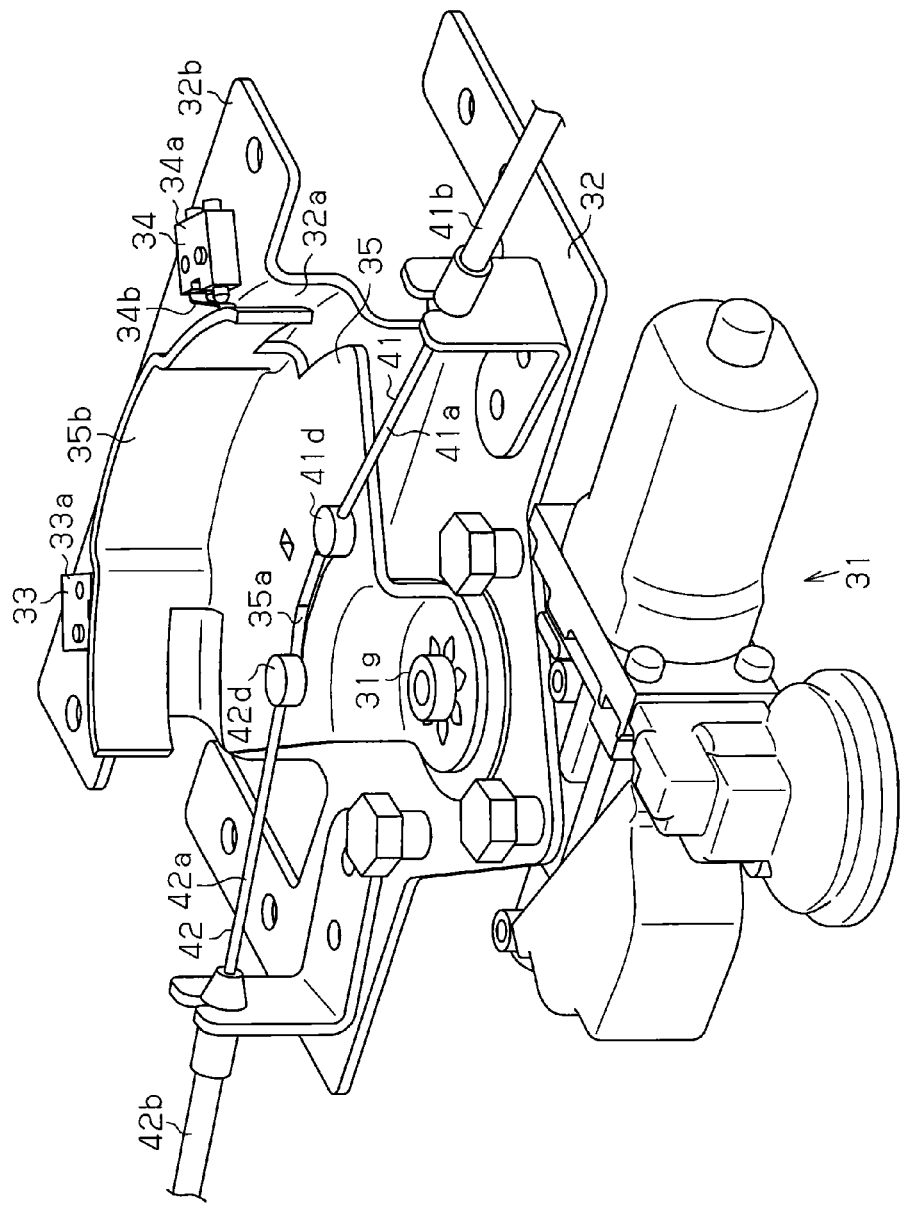
FIG. 6 is a partial perspective view showing the vehicle seat device of the embodiment.
Figure 7:
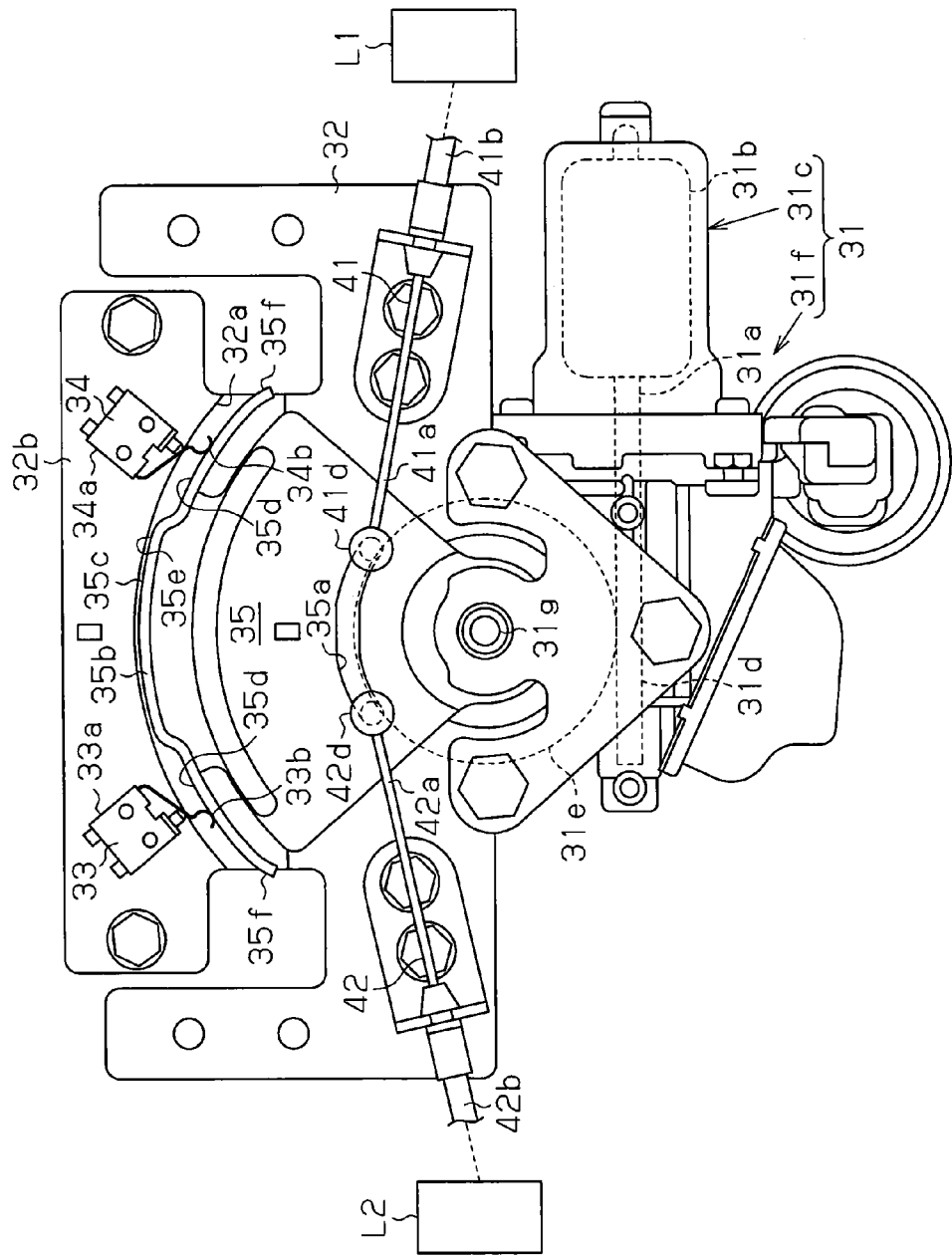
FIG. 7 is a partial plan view showing the vehicle seat device of the embodiment.

Specifically, as shown in FIG. 7, the electric motor 31 includes a motor main body 31c and a reduction portion 31f. The motor main body 31c drives and rotates an armature 31b, which includes a rotation shaft 31a, in a forward or reverse direction. The reduction portion 31f accommodates a worm 31d, which rotates integrally with the rotation shaft 31a, and a worm wheel 31e, which is engaged with the worm 31d. As shown in FIG. 6, the electric motor 31 is fixed to the lower surface of the bracket plate 32 such that only an output shaft 31g, which rotates integrally with the worm wheel 31e, projects out of the upper surface of the bracket plate 32.

As shown in FIGS. 6 and 7, the bracket plate 32 includes an arc wall 32a and a switch support 32b. The arc wall 32a extends in the vertical direction with an arcuate shape about the axis of the output shaft 31g as viewed in the axial direction of the output shaft 31g. The switch support 32b extends from the top end of the arc wall 32a and away from the output shaft 31g. The switch support 32b supports a first limit switch 33, which serves as a first switch, and a second limit switch 34, which serves as a second switch. The first and second limit switches 33, 34 are arranged on the switch support 32b at positions corresponding to the two ends of the arc wall 32a in the circumferential direction. The first and second limit switches 33, 34 are switched on (generating output signals indicating the on state) when levers 33b, 34b extending from switch main bodies 33a, 34a are pushed. The levers 33b, 34b are fixed in a state projecting inward (toward the output shaft 31g) from the arc wall 32a.

The output plate 35, which functions as an output portion, is fixed to the output shaft 31g. The output plate 35 is formed by a metal plate and substantially has the shape of a sector having a smaller radius than the arc wall 32a. The output plate 35 includes a slot 35a that substantially has the shape of an arc extending about the output shaft 31g. As shown in FIG. 6, the radially outer side of the output plate 35 is bent in the thickness direction of the output plate 35 (upward) to form a bent portion 35b that extends along the inner surface of the arc wall 32a. The bent portion 35b extends upward beyond the levers 33b, 34b of the first and second limit switches 33, 34. The bent portion 35b includes an outer surface in the radial direction (facing the first and second limit switches 33, 34) that defines a control surface 35e. As shown in FIG. 7, the control surface 35e includes a projection surface 35c and depression surfaces 35d that are continuously arranged in the pivot direction such that the radial position of the control surface 35e varies in the pivoting direction the control surface 35e. The control surface 35e of the present embodiment includes the projection surface 35c at the middle portion in the circumferential direction and the depression surfaces 35d at the two circumferential sides of the projection surface 35c. When the output plate 35 is at the neutral position (see FIG. 7), the levers 33b, 34b of the first and second limit switches 33, 34 face the depression surfaces 35d. The depression surfaces 35d have an arc radius that is set such that when the depression surfaces 35d face the levers 33b, 34b, the depression surfaces 35d are in contact with the lever 33b, 34b while maintaining the first and second limit switches 33, 34 in off states (in other words, not pushing the levers 33b, 34b). The projection surface 35c has an arc radius set such that when the output plate 35 is pivoted and the projection surface 35c faces one of the levers 33b, 34b (see FIGS. 9 and 11), the projection surface 35c pushes the lever 33b or 34b to switch on the first limit switch 33 or the second limit switch 34.

Figure 11:
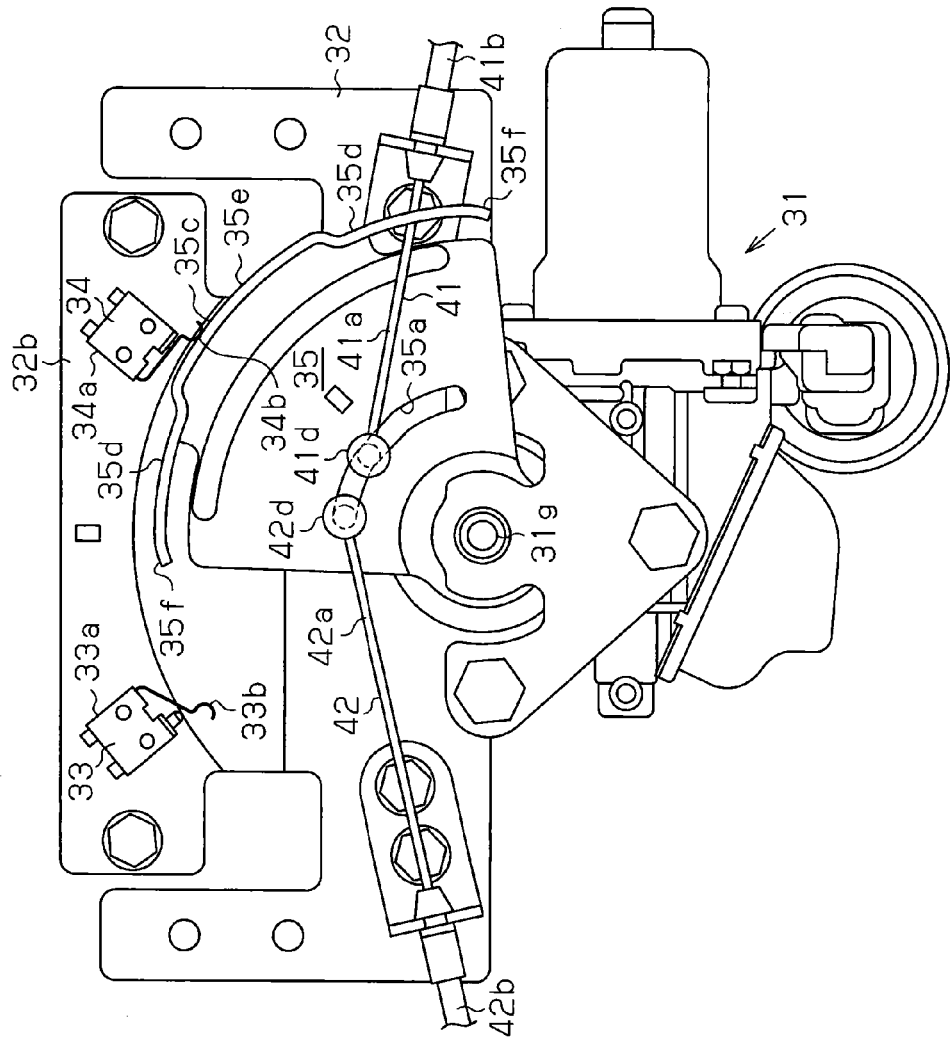
FIG. 11 is a partial plan view showing an operation of the vehicle seat device of the embodiment.

The control surface 35e has a length in the circumferential direction set such that the control surface 35e does not face the lever 34b of the second limit switch 34 when the output plate 35 is pivoted to the pivot end in the forward direction (see FIG. 9) and the control surface 35e does not face the lever 33b of the first limit switch 33 when the output plate 35 is pivoted to the pivot end in the reverse direction (see FIG. 11). The control surface 35e has two end portions in the circumferential direction that include bent parts 35f, which gradually decreases the radial distance between the control surface 35e and the levers 33b, 34b when the output plate 35 is pivoted from one pivot end to the neutral position. In other words, the radius of the bent parts 35f gradually becomes smaller than the radius of the depression surface 35d toward the circumferential ends of the control surface 35e.

A first wire cable 41 is coupled to the slot 35a of the output plate 35 to cancel the restriction of the first lock mechanism L1 when the output plate 35 pivots in the forward direction (counterclockwise direction as viewed in FIG. 7) from the neutral position. A second wire cable 42 is coupled to the slot 35a of the output plate 35 to cancel the restriction of the second lock mechanism L2 when the output plate 35 pivots in the reverse direction (clockwise direction as viewed in FIG. 7) from the neutral position.

Specifically, the first and second wire cables 41, 42 include outer tubes 41b, 42b and inner wires 41a, 42a that are movable in the outer tubes 41b, 42b in the longitudinal direction.

As shown in FIG. 2, the inner wire 41a of the first wire cable 41 includes a distal end 41c that is coupled to an operation plate 44. The operation plate 44 includes an operation piece 44a. When pulled, the operation plate 44 pivots against the urging force of a torsion spring 43 (as indicated by the double-dashed lines in FIG. 2), and its operation piece 44a applies an operating force to the locking lever 15 (as indicated by the double-dashed lines in FIG. 3) The distal end 41c of the inner wire 41a of the present embodiment is coupled to a slot 44b of the operation plate 44 such that when the operation plate 44 is pivoted by another external force, the distal end 41c allows the pivoting of the operation plate 44 without receiving the external force (i.e., the distal end 41c only relatively moves in the slot 44b). The operation plate 44 is coupled, for example, to a manual operation lever, and a user may pivot the operation plate 44 by operating the manual operation lever. The distal end 41c of the inner wire 41a of the present embodiment is coupled only to the operation plate 44 of one of the two upper rails 12 arranged in the vehicle width direction (right upper rail 12 as viewed in FIG. 1). The operation plate 44 is coupled to the operation plate (not shown) of the other upper rail 12 by a power-transmitting rod so that the two operation plates integrally pivot.

Figure 8:
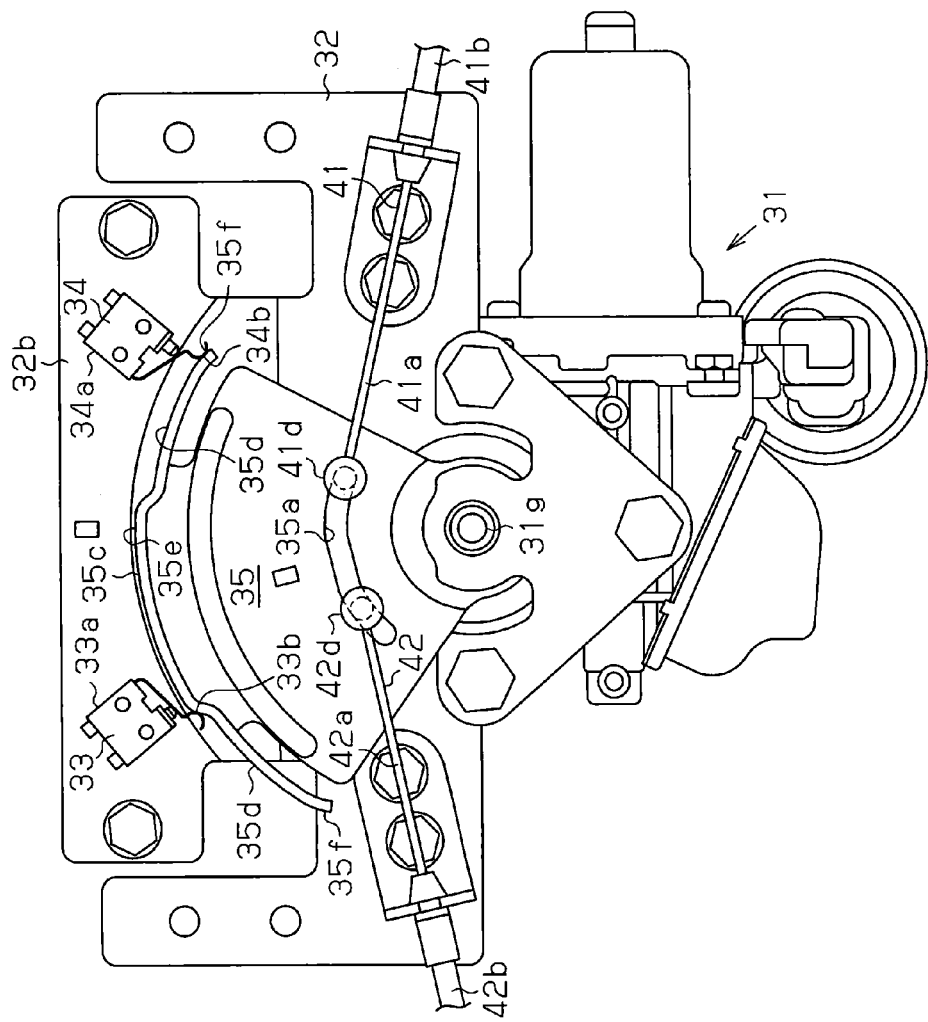
FIG. 8 is a partial plan view showing an operation of the vehicle seat device of the embodiment.
Figure 10:
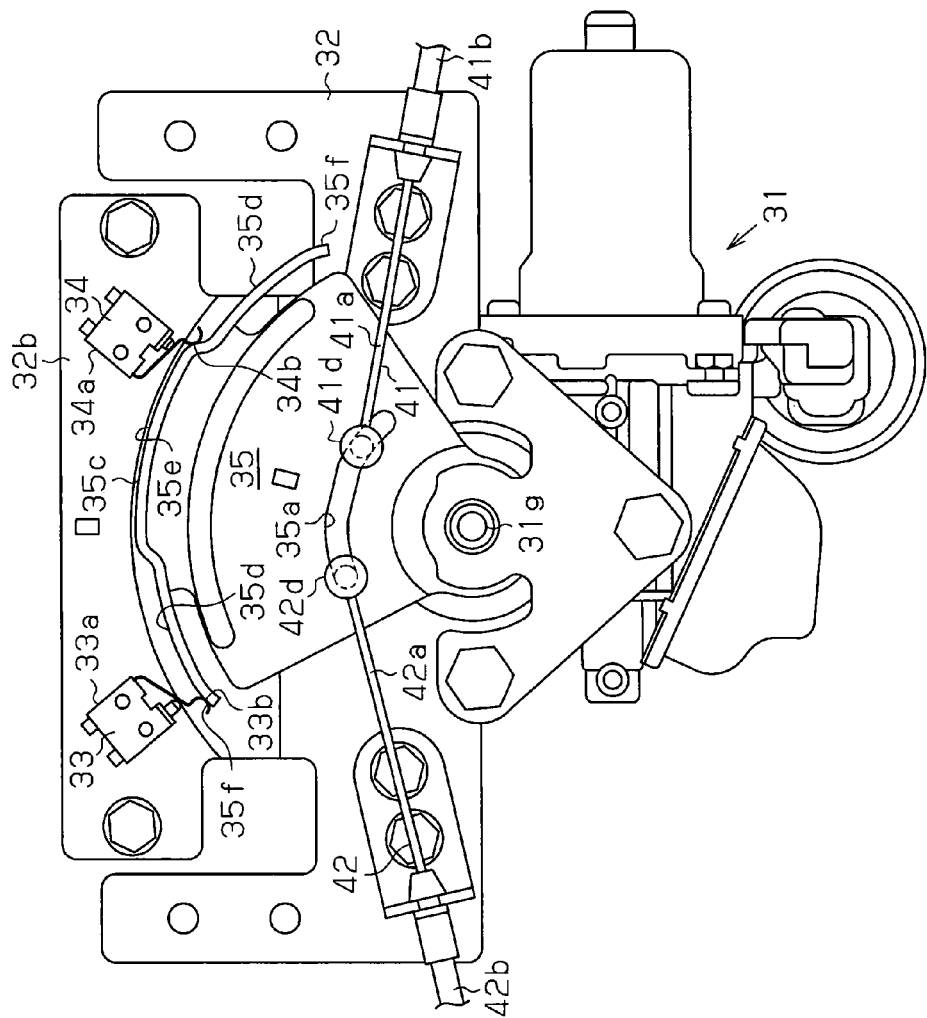
FIG. 10 is a partial plan view showing an operation of the vehicle seat device of the embodiment.

As shown in FIGS. 6 and 7, the inner wire 41a of the first wire cable 41 has a proximal end 41d that is coupled to the output plate 35 and pulled when the output plate 35 is driven in the forward direction from the neutral position (see FIG. 8). In other words, the output plate 35 is coupled to pull the inner wire 41a of the first wire cable 41, which is coupled to the first lock mechanism L1, when the output plate 35 is driven in the forward direction from the neutral position. As shown in FIGS. 10 and 11, the proximal end 41d of the inner wire 41a of the present embodiment is coupled to the output plate 35 such that when the output plate 35 is driven in the reverse direction from the neutral position, the proximal end 41d allows the pivoting of the output plate 35 without receiving the driving force of the output plate 35 (the proximal end 41d moves only relatively in the slot 35a). In other words, the output plate 35 is coupled such that when the output plate 35 is driven in the reverse direction from the neutral position, the driving force is not transmitted to the inner wire 41a of the first wire cable 41.

As shown in FIG. 4, the inner wire 42a of the second wire cable 42 includes a distal end 42c that is coupled to an operation plate 46. The operation plate 46 includes an operation piece 46a. When pulled, the operation plate 46 pivots against the urging force of a torsion spring 45 (as indicated by the double-dashed lines in FIG. 4). Thus, the operation piece 46a applies an operating force to the locking lever 24 (as indicated by the double-dashed lines in FIG. 5). As shown in FIG. 1, the inner wire 42a of the present invention is branched into two distal ends 42c (one proximal end 42d) at a branch portion 47. The distal ends 42c are coupled to the corresponding operation plates 46 of the two lateral slide upper rails 22 that are arranged in the vehicle front-rear direction.

Figure 9:
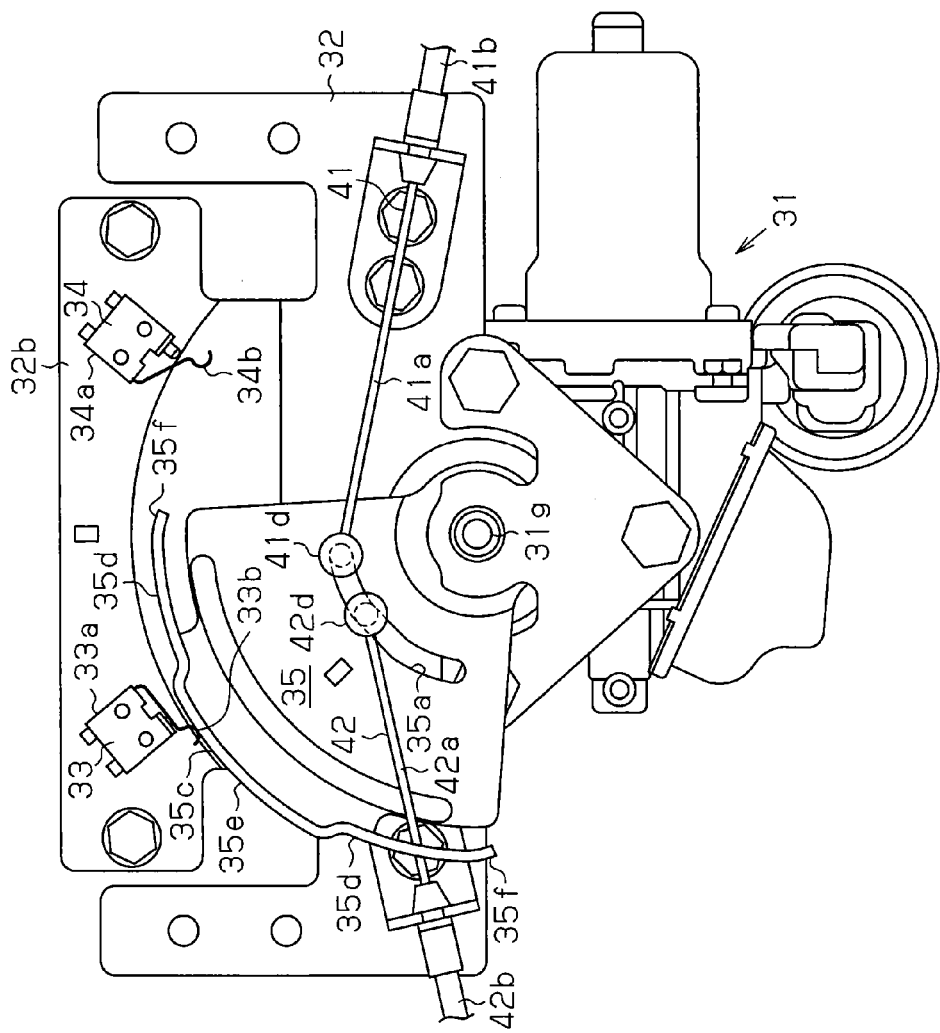
FIG. 9 is a partial plan view showing an operation of the vehicle seat device of the embodiment.

As shown in FIGS. 6 and 7, the proximal end 42d of the inner wire 42a of the second wire cable 42 is coupled to the output plate 35 to be pulled when the output plate 35 is driven in the reverse direction from the neutral position (see FIGS. 10 and 11). In other words, the output plate 35 is coupled to pull the inner wire 42a of the second wire cable 42, which is coupled to the second lock mechanism L2, when the output plate 35 is driven in the reverse direction from the neutral position. As shown in FIGS. 8 and 9, the proximal end 42d of the inner wire 42a of the present embodiment is coupled to the output plate 35 such that, when the output plate 35 is driven in the forward direction from the neutral position, the proximal end 42d allows the pivoting of the output plate 35 without receiving the driving force of the output plate 35 (the proximal end 42d moves only relatively in the slot 35a). In other words, the output plate 35 is coupled such that when the output plate 35 is driven in the forward direction from the neutral position, the driving force is not transmitted to the inner wire 42a of the second wire cable 42.

The structure described above allows for the electric motor 31 to cancel the restriction imposed by the first lock mechanism L1 by driving the output plate 35 in the forward direction (see FIG. 9) from the neutral position (see FIG. 7) and cancel the restriction imposed by the second lock mechanism L2 by driving the output plate 35 in the reverse direction (see FIG. 11) from the neutral position.

The electric motor 31 of the present invention is configured to prevent external force from moving the output plate 35 when the electric motor 31 is in a deactivated state. Specifically, the electric motor 31 is configured to have sufficient retention force that prevents the output plate 35 from being moved toward the neutral position by the urging force of the torsion springs 16, 43, 45 when deactivated after driving the output plate 35 to the pivot end in the forward or reverse direction (see FIGS. 9 and 11) from the neutral position (FIG. 7). In the present embodiment, the retention force of the electric motor 31 is set by the gear ratio, shape, and the like of the worm 31d and worm wheel 31d (see FIG. 7). However, other means, such as a clutch arranged between the rotation shaft 31a and the worm 31d, may be used to generate the retention force.

In the present embodiment, the direction in which the proximal end 41d of the inner wire 41a moves when the output plate 35 is driven from the neutral position to the pivot end in the forward direction (see FIG. 9) and the direction in which the proximal end 42d of the inner wire 42a moves when the output plate 35 is driven from the neutral position to the pivot end in the reverse direction (see FIG. 11) do not extend along the same straight line and form an angle. In other words, in the present embodiment, the pulling direction of the inner wire 41a of the first wire cable 41 and the pulling direction of the inner wire 42a of the second wire cable 42 do not extend along the same straight line and form an angle (other than 180°, about 155° in this embodiment).

The first limit switch 33 is switched between the on-state and off-state (output signals indicating each state) when the output plate 35 is located at a position closer to the neutral position than the position of the output plate 35 at which the first lock mechanism L1 is switched between restriction and non-restriction states (as shown in FIG. 8). In other words, as shown in FIG. 8, when the output plate 35 is located at a position where the lever 33b of the first limit switch 33 switches to a pushed state, it is ensured that movement of the upper rail 12 (and thus the seat 26) in the vehicle front-rear direction is restricted by the first lock mechanism L1. When the output plate 35 is further driven in the forward direction (counterclockwise direction as viewed in FIG. 8), the first limit switch 33 is turned on. Then the restriction imposed by the first lock mechanism L1 is cancelled. In this manner, restriction of the movement of the upper rail 12 (and thus the seat 26) in the vehicle front-rear direction is ensured when the first limit switch 33 is in the off state. When the first limit switch 33 is in the on state, a passenger would recognize that the restriction imposed by the first lock mechanism L1 may be cancelled.

The second limit switch 34 is switched between the on-state and off-state (output signals indicating each state) when the output plate 35 is located at a position closer to the neutral position than the position of the output plate 35 at which the second lock mechanism L2 is switched between restriction and non-restriction states (as shown in FIG. 10). In other words, as shown in FIG. 10, when the output plate 35 is located at a position where the lever 34b of the second limit switch 34 switches to a pushed state, it is ensured that movement of the lateral slide upper rail 22 (and thus the seat 26) in the vehicle width direction is restricted by the second lock mechanism L2. When the output plate 35 is further driven in the reverse direction (clockwise direction as viewed in FIG. 10), the second limit switch 34 is turned on. Then, the restriction imposed by the second lock mechanism L2 is cancelled. In this manner, restriction of the movement of the lateral slide upper rail 22 (and thus the seat 26) in the vehicle width direction is ensured when the second limit switch 34 is in the off state. When the second limit switch 34 is in the on-state, a passenger would recognize that the restriction imposed by the second lock mechanism L2 may be cancelled.

The advantages of the embodiments described above will now be described.

(1) The electric motor 31 can drive the output plate 35 in two directions, the forward direction and the reverse direction. The restriction imposed by the first lock mechanism L1 is cancelled when the output plate 35 is driven in the forward direction from the neutral position, and the restriction imposed by the second lock mechanism L2 is released when the output plate 35 is driven in the reverse direction from the neutral position. This reduces the number of the electric motors 31 to one. The electric motor 31 is typically heavy and expensive. The weight and cost of the vehicle seat device can be decreased by reducing the number of electric motors.

(2) The output plate 35 is coupled to pull the inner wire 41a of the first wire cable 41 and cancel the restriction imposed by the first lock mechanism L1 when the output plate 35 is driven in the forward direction from the neutral position. In addition, the output plate 35 is coupled such that a driving force is not transmitted to the inner wire 42a of the second wire cable 42 when driven in the forward direction from the neutral direction. The output plate 35 is coupled to pull the inner wire 42a of the first wire cable 42 and cancel the restriction imposed by the second lock mechanism L2 when driven in the reverse direction from the neutral position. In addition, the output plate 35 is coupled such that a driving force is not transmitted to the inner wire 41a of the first wire cable 41 when driven in the reverse direction from the neutral direction. Accordingly, the driving force of the output plate 35 is not transmitted to the first wire cable 41 or second wire cable 42 that does not cancel the restriction. This avoids unnecessary deformation of the inner wires 41a and 42a. If the inner wires 41a, 42a were to be simply coupled to the output plate 35, the one of the inner wires 41a, 42a that is not cancelling restriction would deform and thereby relieve the driving force. The deformation of the inner wires 41a, 42a can be avoided by coupling the inner wires 41a, 42a to the output plate 35 such that the driving force applied in the direction opposite to the direction in which the inner wires 41a, 42a are pulled is not transmitted to the inner wires 41a, 42b. This improves the durability of the inner wires 41a, 42a.

(3) The output plate 35 includes the slot 35a that substantially has the shape of an arc extending about the output shaft 31g of the output plate 35. The proximal end 41d of the inner wire 41a of the first wire cable 41 is coupled to the slot 35a such that the end portion 41d moves relatively in the slot 35a without receiving a driving force when the output plate 35 is driven in the reverse direction from the neutral position. The proximal end 42d of the inner wire 42a of the second wire cable 42 is coupled to the slot 35a such that the end portion 42d moves relatively in the slot 35a without receiving a driving force when the output plate 35 is driven in the forward direction from the neutral position. Accordingly, advantage (2) can also be achieved in the structure that pivots the output plate 35.

The direction in which the proximal end 41d of the inner wire 41a moves when the output plate 35 is driven from the neutral position to the pivot end in the forward direction (see FIG. 9) and the direction in which the proximal end 42d of the inner wire 42a moves when the output plate 35 is driven from the neutral position to the pivot end in the reverse direction (see FIG. 11) do not extend along the same straight line and form an angle. Accordingly, compared to a structure in which the proximal end 41d of the inner wire 41a of the first wire cable 41 and the proximal end 24d of the inner wire 42a of the second wire cable 42 are pulled along the same straight line (structure in which the pulling amounts (strokes) are added together along the same straight line), the present embodiment reduces the size of the vehicle seat device in the direction of the straight line.

(4) The driving source is the electric motor 31 driven when activated and is configured to prevent the output plate 35 from being moved by an external force when the electric motor 31 is in a deactivated state. Accordingly, for example, when maintaining the state in which the output plate 35 is driven from the neutral position in the forward direction, or maintaining the state in which the restriction imposed by the first lock mechanism L1 is cancelled, deactivation of the electric motor 31 reduces heat generation and the power consumption of the electric motor 31.

(5) The output signals of the first limit switch 33 are switched when the output plate 35 is located at a position closer to the neutral position than the position corresponding to where the first mechanism L1 is switched between restriction and non-restriction states. Thus, the output signals of the first limit switch 33 ensure that the movement of the upper rail 12 (seat 26) in the vehicle front-rear direction is restricted by the first lock mechanism L1. The output signals of the second limit switch 34 are switched when the output plate 35 is located at a position closer to the neutral position than the position corresponding to where the second mechanism L2 is switched between restriction and non-restriction states. Thus, the output signals of the second limit switch 34 ensure that the movement of the lateral slide upper rail 22 (seat 26) in the vehicle width direction is restricted by the second lock mechanism L2. The movement restriction of the seat 26 in the vehicle front-rear direction and the vehicle width direction is ensured by a simple structure. In addition, a passenger can be notified that the restriction may be cancelled.

(6) The depression surfaces 35d of the control surface 35e are in contact with the levers 33b, 34b while the first and second limit switches 33, 34 remain off when the output plate 35 is at the neutral position (in other words, the depression surfaces 35d are in contact with the levers 33b, 34b but do not push the levers 33, 34b). This avoids contact of the levers 33b, 34b with the control surface 35e whenever the output plate 35 is pivoted and the levers 33b, 34b are pushed by the projection surface 35c of the control surface 35e. In other words, if the depression surfaces 35d were arranged out of contact with the levers 33b, 34b, the levers 33b, 34b would come into contact with the control surface 35e whenever the output plate 35 is pivoted and the levers 33b, 34b are pushed by the projection surface 35c. This is avoided in the present embodiment. Accordingly, the number of contacts from a state in which the levers 33b, 34 are separated from the control surface 35e can be reduced. This improves the durability of the levers 33b, 34b and, consequently, the first and second limit switches 33, 34.

(7) The control surface 35e has a circumferential length set so that the control surface 35e does not face the levers 33b, 34b of one of the first and second limit switches 33, 34 when the output plate 35 is pivoted to one of the pivot ends (see FIGS. 9 and 11). The control surface 35e includes two circumferential end portions, each including a bent part 35f that gradually decreases the radial distance between the levers 33b, 34b and the control surface 35e as the output plate 35 pivots from the pivot end to the neutral position. This reduces the impact when the control surface 35e comes into contact with the levers 33b, 34b. This improves the durability of the levers 33b, 34b and, consequently, the first and second limit switches 33, 34, while lowering the material cost by decreasing the circumferential length of the control surface 35e.

(8) The output plate 35, which functions as the output portion, is formed from a metal plate that is relatively inexpensive. The control surface 35e is formed by the bent portion 35b obtained by being the radially outer side of the output plate 35 in the thickness direction. This reduces the manufacturing cost of the output portion. In addition, the control surface 35e can have a sufficient width along the pivot axis of the control surface 35e. Accordingly, the levers 33b, 34b of the first and second limit switches 33, 34 are prevented from being separated from the control surface 35e in the direction of the pivot axis of the control surface 35e. If the control surface were formed on the circumferential surface of the metal plate instead of on the bent portion 35b, the control surface would have a width (thickness) along the pivot axis of the control surface that conforms to the thickness of the metal plate, and the levers 33b, 34b would be separated from the control surface in the direction of the pivot axis of the control surface. This is easily avoided in the present embodiment.

The above embodiment may be modified as described below.

The inner wires 41a, 42b may be simply coupled and fixed to the output plate 35. In this structure, the inner wire 42a deforms when the output plate 35 is driven in the forward direction from the neutral position, and the inner wire 41a deforms when the output plate 35 is driven in the reverse direction from the neutral position.

The direction in which the proximal end 41d of the inner wire 41a of the first wire cable 41 is pulled and the direction in which the proximal end 42d of the inner wire 42a of the second wire cable 42 is pulled may be set to extend along the same straight line.

The electric motor may be modified not to produce a retention force. In this structure, the electric motor is required to be kept activated when maintaining the state in which the output plate 35 is driven from the neutral position in the forward direction, or maintaining the state in which the restriction imposed by the first lock mechanism L1 is cancelled.

The first and second limit switches 33, 34 may be omitted or replaced by other types of switches functioning to ensure similar restrictions, such as sensors. In addition, an additional limit switch may be arranged, for example, to directly control the electric motor 31 (to detect a stop position).

The depression surface 35d of the control surface 35e does not have to contact the levers 33b, 34b.

The control surface 35e may have a circumferential length set so that the control surface 35e always faces one of the levers 33b, 34b of the first and second limit switches 33, 34. By forming the depression surfaces 35d to be in contact with the levers 33b, 34b in addition to setting the length of the control surface 35e as described above, the levers 33b, 34b are not separated from the control surface 35e. This avoids contact of the levers 33b, 34 with the control surface 35e after being separated from the control surface 35e. This further improves the durability of the levers 33b, 34b and, consequently, the durability of the first and second limit switches 33, 34.

The bent part 35f may be omitted.

The control surface 35e may be formed in a portion other than the bent portion 35b. For example, the bent portion 35b may be omitted, and the control surface 35e may be formed on the circumferential surface of the output plate 35 (width along the pivot axis, which is the same as the plate thickness of the metal plate). Alternatively, an additional member that includes the control surface 35e may be fixed to an output plate 35 that does not include the bent portion 35b.

The driving source may be replaced by any driving source as long as it can drive the output portion in two directions, the forward and reverse directions. For example, a driving source (linear actuator) may be used that can drive the output portion in the two directions of forward and reverse along the same straight line.

The first and second lock mechanisms L1, L2 may be replaced by other mechanisms that function in similar manners.

The first and second lock mechanisms L1, L2 may be modified to restrict movements of the seat 26 other than the movement in the vehicle front-rear direction (first movement) and the movement in the vehicle width direction (second movement). For example, the second lock mechanism L2 may restrict, as a second movement, the reclining of a seat back (backrest) that can recline with respect to the seat cushion forming the seating surface of the seat 26.

The invention claimed is:

1. A vehicle seat device comprising:
a first lock mechanism that restricts a first movement of a seat;
a second lock mechanism that restricts a second movement of the seat; and
a driving source that cancels the restrictions imposed by the first and second lock mechanisms, wherein
the driving source includes an output portion that can be driven by the driving source in two directions, a forward direction and a reverse direction,
the output portion is driven in the forward direction from a neutral position to cancel the restriction imposed by the first lock mechanism, and
the output portion is driven in the reverse direction from the neutral position to cancel the restriction imposed by the second lock mechanism, the vehicle seat device further comprising:
a first switch that switches output signals when the output portion is located at a position closer to the neutral position than a position of the output portion corresponding to where the first mechanism is switched between a restriction state and a non-restriction state, and
a second switch that switches output signals when the output portion is located at a position closer to the neutral position than a position of the output portion corresponding to where the second mechanism is switched between a restriction state and a non-restriction state.

2. The vehicle seat device according to claim 1, wherein
a first wire cable is coupled to the first lock mechanism, a second wire cable is coupled to the second lock mechanism,
the output portion is coupled to the first and second wire cables to pull an inner wire of the first wire cable when the output portion is driven in the forward direction from the neutral position and pull an inner wire of the second wire cable when the output portion is driven in the reverse direction from the neutral position, and the output portion is coupled such that a driving force is not transmitted to the inner wire of the second wire cable when the output portion is driven in the forward direction from the neutral direction and such that a driving force is not transmitted to the inner wire of the first wire cable when the output portion is driven in the reverse direction from the neutral direction.

3. The vehicle seat device according to claim 2, wherein
the driving source is a pivoting source that can pivot the output portion,
the output portion includes a slot that substantially has a shape of an arc extending about a pivotal center of the output portion,
the inner wire of the first wire cable has an end portion coupled to the slot so as to be pulled when the output portion is driven in the forward direction from the neutral position and moved relatively in the slot when the output portion is driven in the reverse direction from the neutral position without receiving a driving force, the inner wire of the second wire cable has an end portion coupled to the slot so as to be pulled when the output portion is driven in the reverse direction from the neutral position and moved relatively in the slot when the output portion is driven in the forward direction from the neutral position without receiving a driving force, and a direction in which the end portion of the inner wire of the first wire cable moves when the output portion is driven from the neutral position to a pivot end in the forward direction and a direction in which the end portion of the inner wire of the second wire cable moves when the output portion is driven from the neutral position to a pivot end in the reverse direction do not extend along the same straight line and form an angle.

4. The vehicle seat device according to claim 1, wherein the driving source is an electric motor driven when activated and is configured to prevent movement of the output portion when the electric motor is in a deactivated state.

5. The vehicle seat device according to claim 1, wherein the driving source is a pivoting source that can pivot the output portion, the output portion includes a control surface that has a projection surface and a depression surface arranged continuously in a pivotal direction of the output portion such that a radial position of the control surface varies along the pivotal direction, the first and second switches are each a limit switch that includes a main body portion and a lever extending from the main body portion, the limit switch is arranged such that the limit switch can face the control surface in a radial direction, and the limit switch is in an on-state when the lever is pushed by the projection surface of the control surface depending on a pivotal position of the output portion, the depression surface of the control surface contacts the lever while maintaining the limit switch in an off-state when the output portion is in the neutral position.

6. The vehicle seat device according to claim 5, wherein the control surface has a circumferential length set so that the control surface does not face the lever of the second switch when the output portion is pivoted to a pivot end in the forward direction and the control surface does not face the lever of the first switch when the output portion is pivoted to a pivot end in the reverse direction, the control surface includes two circumferential end portions, and the circumferential end portions each include a bent part that gradually decreases a radial distance from the lever when the output portion pivots from the pivot end to the neutral position.

7. The vehicle seat device according to claim 5, wherein the output portion is formed from a metal plate, and the control surface is formed in a bent portion obtained by bending a radially outer side of the output portion in a thickness direction of the output portion.

\* \* \* \* \*